United States Patent [19]

Permuy

[11] Patent Number: 5,297,720
[45] Date of Patent: Mar. 29, 1994

[54] METHOD OF ASSEMBLING A MECHANICAL PART INCLUDING A SENSITIVE ELEMENT ON A SUPPORT TO DEFINE A VARIABLE CAPACITOR, A MECHANICAL PART, AND A TOOL FOR IMPLEMENTING THE METHOD

[75] Inventor: Alfred Permuy, Paris, France

[73] Assignees: Societe Anonyme: Vectavib; Societe d'Applications Generales d'Electricite et de Mecanique SAGEM, both of France

[21] Appl. No.: 917,029

[22] PCT Filed: Dec. 28, 1990

[86] PCT No.: PCT/FR90/00962
§ 371 Date: Aug. 17, 1992
§ 102(e) Date: Aug. 17, 1992

[87] PCT Pub. No.: WO91/10347
PCT Pub. Date: Jul. 11, 1991

[30] Foreign Application Priority Data

Dec. 28, 1989 [FR] France .................. 8917545

[51] Int. Cl.⁵ .............. G01D 5/24; H01G 5/16; B23K 31/02; B23K 101/36
[52] U.S. Cl. .............. 228/123.1; 228/254; 228/6.2; 228/44.7; 361/283; 361/326
[58] Field of Search .......... 228/122, 123, 164, 179, 228/254, 6.2, 44.7; 361/283, 361

[56] References Cited

U.S. PATENT DOCUMENTS

| 4,670,092 | 6/1987 | Motamedi | 156/643 |
| 4,998,179 | 3/1991 | Grantham et al. | 361/283 |
| 5,067,647 | 11/1991 | Schwarzbauer | 228/44.7 |

FOREIGN PATENT DOCUMENTS

| 3110080 | 9/1982 | Fed. Rep. of Germany . |
| 3531715 | 3/1987 | Fed. Rep. of Germany . |

OTHER PUBLICATIONS

IBM Technical Disclosure Bulletin, vol. 30, No. 1, Jun. 1987, pp. 114–116, Armonk, N.Y., "Robotic Hot Air Solder/Desolder Placement Device".

*Primary Examiner*—Samuel M. Heinrich
*Attorney, Agent, or Firm*—Bacon & Thomas

[57] ABSTRACT

A method of assembling a mechanical part on a support includes making a projecting thickening situated substantially over a connection face of an anchor block of the part; depositing a layer of one of the components of a eutectic on at least one fixing zone of the support; using a tool for holding the thickening to move the part so that its connection face co-operates with the fixing zone of the support; raising the temperature of the eutectic point of the eutectic; exerting localized force on the thickening; and simultaneously subjecting the part or the support to mechanical stresses. The invention is particularly applicable to assembling a capacitive sensor. The invention is also directed to a mechanical part for carrying out the assembly method, as well as a tool for grasping the mechanical part.

10 Claims, 4 Drawing Sheets

METHOD OF ASSEMBLING A MECHANICAL PART INCLUDING A SENSITIVE ELEMENT ON A SUPPORT TO DEFINE A VARIABLE CAPACITOR, A MECHANICAL PART, AND A TOOL FOR IMPLEMENTING THE METHOD

FIELD OF THE INVENTION

The present invention relates to the technical field of methods or processes for assembling a mechanical part on a support, which part includes a flexible element that co-operates with the support to define a variable capacitor. Such parts are intended preferably, but not exclusively, to constitute a capacitive type membrane or sensor of mechanical magnitudes.

In specific fields of application, it appears necessary to use a capacitive sensor of mechanical magnitudes such as force, pressure, or acceleration, for the purpose of delivering electrical signals representative of the measured magnitudes and suitable for application to electronic processing systems to enable automatic measurements, monitoring, regulation, or control to be performed.

In a preferred application, such a capacitive sensor is in the form of a cantilevered beam, made from a monolithic semiconductor substrate, and it includes at least one flexible element of determined thickness attached to an anchor block on the substrate. The flexible element constitutes a moving plate of a variable capacitor whose stationary plate is constituted by a conductive zone formed in the substrate. The space between the plates is constituted by the empty gap between the flexible element and the substrate.

PRIOR ART

The technique of manufacturing such sensors suffers from a first special difficulty which is that of accurately determining the thickness of the flexible element. This dimensional feature must be determined accurately so as to make it possible to obtain a sensor of given sensitivity. A second manufacturing difficulty lies in obtaining the proper difference in level between the substrate and the flexible element, where this difference constitutes the distance between the plates which determines the initial capacitance of the variable capacitor formed in this way.

A first method of manufacturing such sensors, as described in U.S. Pat. No. 4,670,092, consists in etching a base substrate over a given depth having a relationship with the initial thickness of the substrate, thereby allowing a flexible element of corresponding thickness to remain. A drawback of that technique lies in the fact that the flexible element cannot be of small thickness since the substrate must be of relatively great thickness in order to have sufficient mechanical strength. In addition, that technique turns out to be incapable of providing a flexible element of specified thickness since base substrates have different initial thickness due to manufacturing tolerances.

To remedy that drawback, in part, it might be imagined that such sensors could be manufactured from base substrates made to tighter manufacturing tolerances. However such a solution has the consequence of increasing the manufacturing costs of such substrates prohibitively.

A second manufacturing method disclosed in the document "Extended abstracts of the Electrochemical Society", Vol. 82-1, May 1982, abstract No. 120, pp. 188-189, Pennington, N.J. USA, consists in forming an epitaxial layer serving as a stop layer for chemical etching and enabling the thickness of the flexible element to be delimited. That technique suffers from the drawback that the outline of the flexible element is poorly determined because of the anisotropic nature of chemical etching. In addition, such a method requires an epitaxial layer to be made accurately to a given thickness, thereby increasing the cost of manufacturing such sensors in a manner that is not negligible.

As disclosed in EP 89 420-370.2, a third manufacturing method has been developed for avoiding the above-specified drawbacks and enabling a sensor to be made in which the sensitive element has a thickness that can be determined at will and accurately regardless of the initial thickness of the base substrate.

That manufacturing method consists in performing operations of photoetching sensitive layers deposited on opposite faces of the substrate so as firstly to form a peripheral zone delimiting the outline of the sensor, and secondly to delimit the outline of the anchor block. The peripheral zone is etched to form a groove of a depth that is determined relative to the corresponding face and that is equal to the thickness of the flexible element. The substrate is also etched from its opposite face down to the bottom of the groove, such that the sensor becomes detached from the substrate enabling it to be placed in a non-etch zone, thus enabling a flexible element of determined thickness to be obtained.

Although such a manufacturing method makes it possible to provide a sensor having a flexible element of determined thickness, a problem arises with assembling the sensor formed in this way to a support.

The invention seeks to solve this problem by proposing a method of assembling a mechanical part on a support, the part including at least one flexible element that co-operates with the support to define at least one variable capacitor and the method making it possible to define accurately the inter-plate gap that extends between the flexible element of the part and the support.

The invention also seeks to provide a method of assembling a mechanical part on a support that enables the capacitor plates to be positioned in planes that are substantially parallel.

SUMMARY OF THE INVENTION

To achieve the above-mentioned objects, the present invention provides a method of assembling on a support, a mechanical part such as a sensor or a membrane constituted firstly by an anchor block including a connection face extending in a reference plane and secondly by at least one flexible element connected to the anchor block and extending along a face determining a moving plate lying in a plane that is offset from the reference plane, thereby constituting an empty gap relative to a corresponding stationary plate carried by the support, thus defining a variable capacitor;
wherein the method comprises the following steps:
making a projecting thickening situated substantially over the connection face of the anchor block;
depositing a layer of one of the components of a eutectic at least on a fixing zone of the support for receiving the connection face of the anchor block;
using a grasping tool suitable for holding the mechanical part by means of its thickening to move the part so that its connection face co-operates with the fixing zone of the support;

causing a rise in temperature to the eutectic point of the eutectic whose second component is formed by the part;

exerting a localized force on the thickening to ensure plane contact between the connection face and the fixing zone; and simultaneously with the application of the localized force, subjecting the part or the support to mechanical stresses enabling the part to be anchored on the support by soldering.

Various other characteristics appear from the following description made with reference to the accompanying drawings which show implementations of the invention by way of non-limiting example.

BEST METHOD OF PERFORMING THE INVENTION

Figure 1:
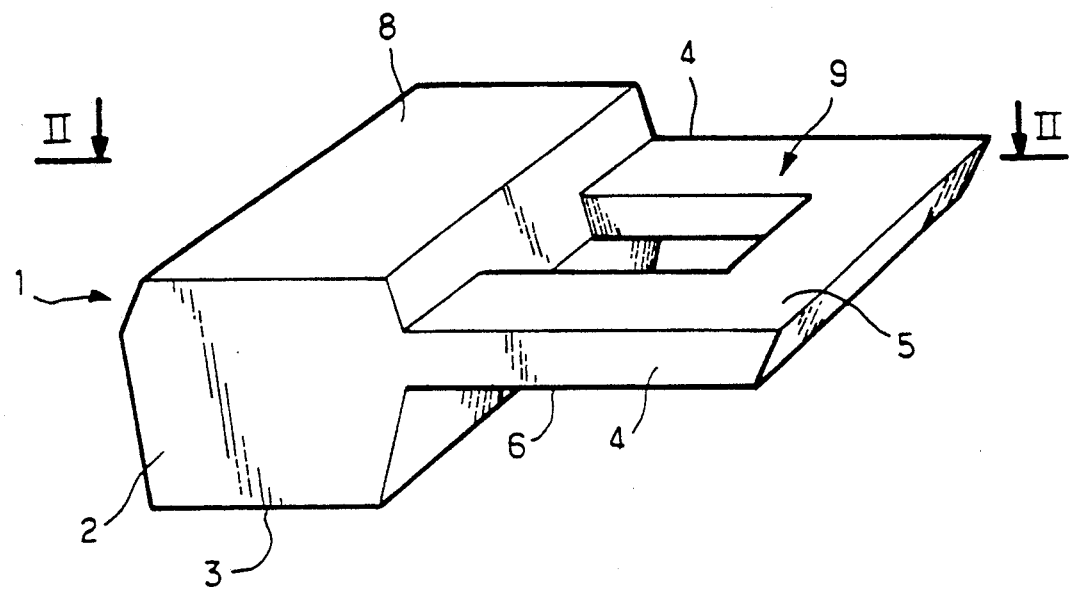
FIG. 1 is a perspective view showing an embodiment of a mechanical part suitable for implementing the assembly method of the invention.
Figure 2:
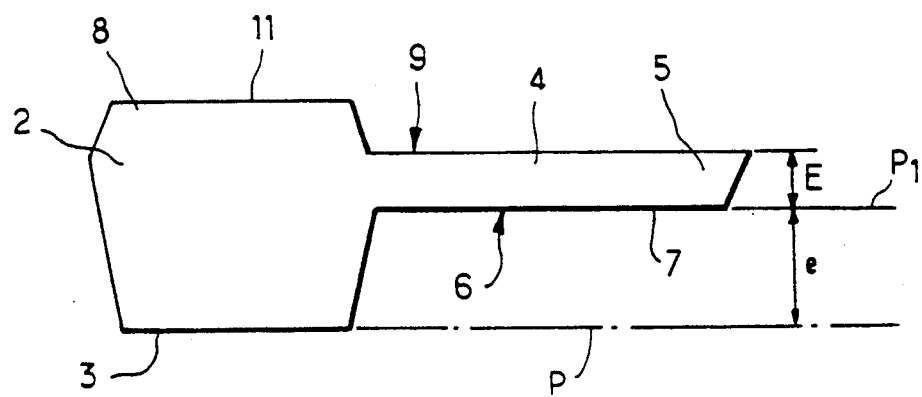
FIG. 2 is a section view substantially on line II—II of FIG. 1.

FIGS. 1 and 2 show an embodiment of a mechanical part 1 suitable, in this example, for constituting an integrated sensor of mechanical magnitudes and for providing a signal at a level compatible with electronic processing techniques.

The sensor 1 (which may constitute an accelerometer for example) is preferably, but not exclusively, made from a base substrate of monocrystalline silicon. The sensor 1 is constituted by at least one anchor block having a plane connection face 3 extending in a reference plane P. The sensor 1 also includes at least one, and in the example shown, two elements 4 that are deformable in bending and that are attached to the anchor block 2, being cantilevered out therefrom. The flexible elements 4 are connected together at their free ends by a terminal portion 5. Each flexible element 4 includes a face 6 extending in a plane $P_1$, that is offset from the reference plane P and that co-operates with the terminal portion 5 to define a plate 7 of a capacitor whose function and structure are described in detail below.

It should be observed that the flexible elements 4 are made of a material that is sufficiently doped to form conductive plates or electrodes. In addition, it should be assumed that each flexible element 4 has a determined thickness E lying in the range 10 microns to 100 microns, while the distance e between the plane P and $P_1$ is of the order of a few microns.

In accordance with the invention, the sensor 1 is provided with a thickening 8 situated substantially over the connection face 3 of the anchor block. The thickening 8 whose function appears clearly from the description below is designed to have at least one portion that exists vertically over the connection face 3 and that projects relative to the face 9 of the flexible elements 4 opposite to the face 6. In the example shown, the thickening 8 includes a plane face 11 extending in a plane substantially parallel to the planes P and $P_1$ and extending over substantially the same area as the connection face 3.

Figure 3A:
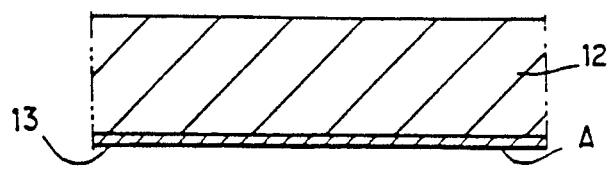
FIGS. 3A to 3H are section views showing different stages in the manufacture of a mechanical part of the invention.
Figure 3B:
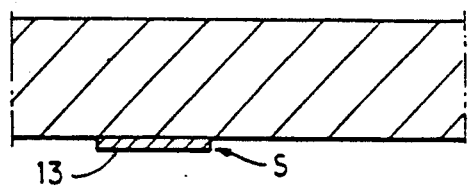
Figure 3C:
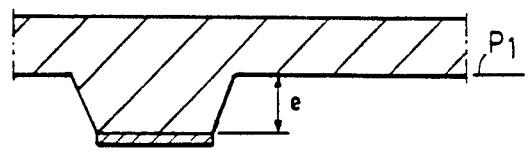

The sensor 1 as described above is preferably made by the manufacturing method shown in FIGS. 3A to 3H. Starting from a substrate 12 suitable for making the part to be made, such as monocrystalline silicon in the example shown, a sensitive layer 13 is deposited on the reference face A of the substrate (FIG. 3A). The sensitive layer 13 is subjected to a photoetching operation (FIG. 3B) for delimiting the outline S of the connection face 3 of the anchor block 2. The face A is then etched to a determined depth corresponding to the distance e (FIG. 3C).

Figure 3D:
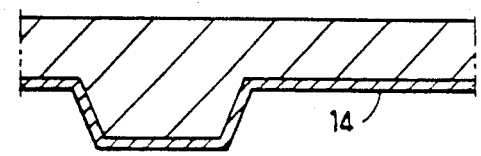
Figure 3E:
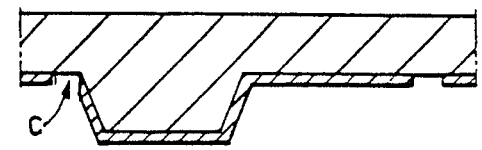
Figure 3F:
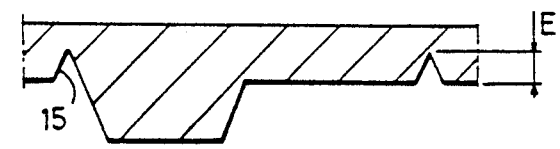
Figure 3G:
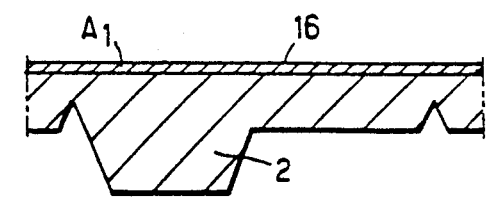

A sensitive layer 14 is then deposited on the face of the substrate that has just been etched (FIG. 3D). The sensitive layer 14 is then subjected to a photoetching operation (FIG. 3E) suitable for forming a peripheral zone c that delimits the outline in a plane of the sensor, as defined at the level of the plane $P_1$. The peripheral zone c is subjected to etching so as to form a groove 15 of determined depth corresponding to the thickness E of the flexible elements 4 (FIG. 3F).

Figure 3H:
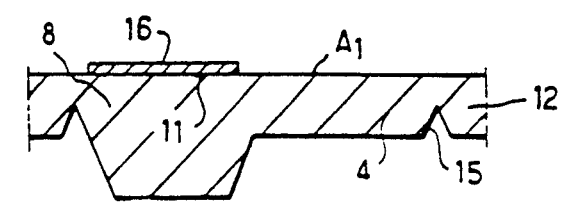

After a sensitive layer 16 has been deposited on the face $A_1$ of the substrate opposite to its face A (FIG. 3G), a photoetching operation is performed on said layer 16 to delimit the plane constituting the face 11 of the thickening 8 (FIG. 3H). The face $A_1$ is then subjected to etching which is continued until the bottom of the groove 15 is reached, thereby enabling the sensor to be cut out from the substrate 12. The sensor cut out in this way corresponds to that shown in FIGS. 1 and 2, and it is immediately placed in a zone for stopping etching, thereby making it possible to obtain flexible elements 4 of determined thickness E.

It should be observed that the method of manufacturing the sensor as described above may be implemented by plasma etching or by using a bath of an etching liquid that acts isotropically or anisotropically.

Figure 4:
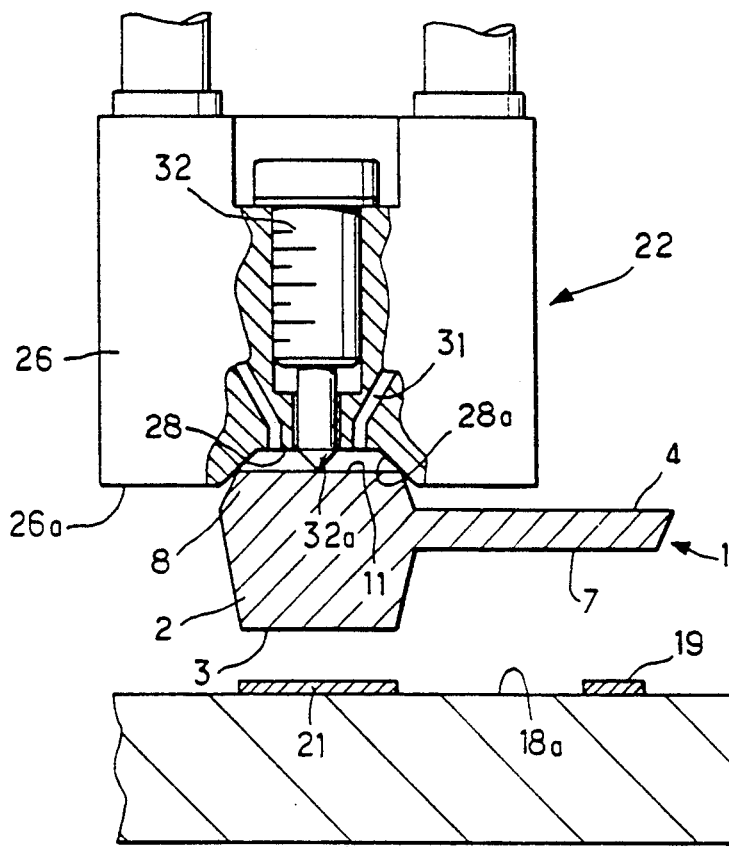
FIG. 4 is a fragmentary section for explaining the assembly method of the invention.
Figure 5:
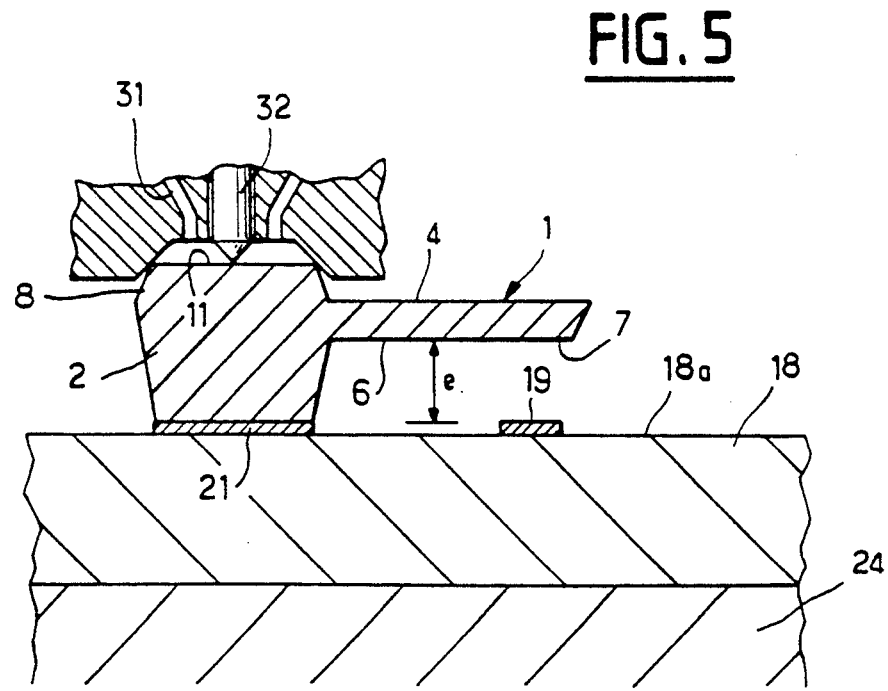
FIG. 5 is a section view showing a mechanical part assembled on a support.

As can be seen more clearly in FIGS. 4 and 5, the sensor 1 manufactured in this way is designed to be assembled, in accordance with the invention, on a support 18 in such a manner that each moving plate 7 of a flexible element 4 is positioned in a distance relationship relative to a stationary plate 19 to constitute a capacitor. The gap between the face of the stationary plate 19 and the face 6 constitutes the dielectric of the capacitors formed in this way. In the example shown, the support 18 is constituted by an alumina substrate having a thickness of about 0.6 mm to about 1 mm.

Before the sensor 1 is assembled on the support 18, the support is provided with a eutectic component deposited in a layer over a zone 21 for receiving the connection face 3 of the anchor block 2. The deposited eutectic component may be gold, for example, and the thickness of the layer may be about 1 micron.

Naturally, the stationary plate 19 is also made on the support, preferably by depositing a layer of gold. In addition, it must be assumed that the zone 21 and the stationary plate 19 are connected by means of conductive paths (not shown) to connections providing access to the terminals of the stationary and moving plates.

The sensor 1 is designed to be displaced by means of a grasping tool 22 that co-operates with the thickening 8 in such a manner as to ensure that the connection face 3 of the anchor block 2 is made to co-operate with the fixing zone 21 on the support. In addition, the grasping tool 22 exerts a localized force on the face 11 of the thickening 8 so as to ensure plane contact between the connection face 3 and the support 18. The plane positioning of the anchor block 2 on the support 18 makes it possible to guarantee a given value to the gap that exists between the plates 7 and 19.

The sensor 1 and the support 18 which may be placed on a hotplate 24 are raised in temperature to the eutectic point of the eutectic whose first component is formed by the gold deposited on the zone 21 and whose second component is constituted by the material from which the sensor is made. The support 18 and/or the sensor 1 is/are simultaneously subjected to mechanical forces enabling the two components of the eutectic to diffuse into each other. Assembly by soldering in this way ensures that the part is efficiently fixed on the support.

The assembly method of the invention thus makes it possible, using a sensor having at least one flexible element 4 of given thickness E, to obtain a determined gap between the stationary plate 19 and the moving plate 7 of a capacitor, since the distance e of the sensor corresponds exactly to said inter-plate gap because the method of fixing used ensures that the connection face 3 is positioned directly on the surface 18a of the support (ignoring the thickness of the zone 21 and of the plate 19). In addition, by obtaining plane thrust between the connection face 3 and the surface 18a of the support, it is possible to position the plates 7 and 19 in planes that are parallel. Satisfying the two above-specified characteristics ensures that the capacitance of the capacitor(s) formed in this way is accurately determined.

Figure 6:
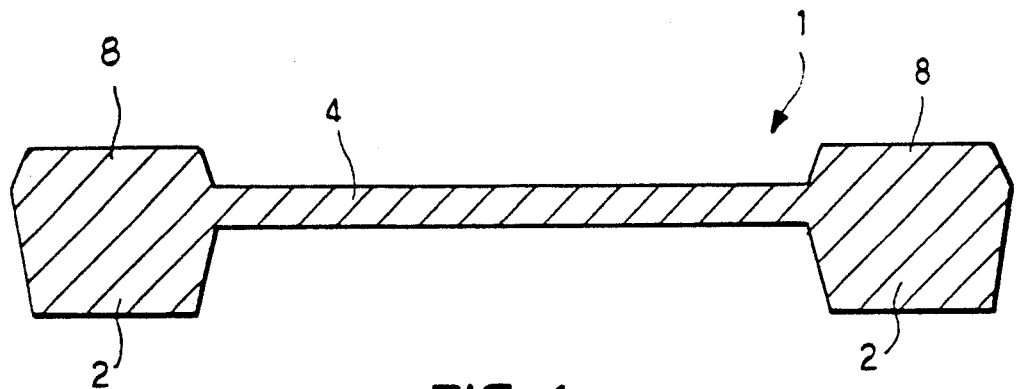
FIG. 6 is a section view showing another embodiment of a mechanical part suitable for being assembled on a support by the method of the invention.

The assembly method described above for making a capacitor sensor constituted in the form of a cantilevered beam having two flexible elements connected to an anchor block may naturally be used for making a sensor having one or more capacitors and comprising a plurality of anchor blocks and/or various flexible elements of determined thickness (equal or unequal). In addition, such sensors may be provided with localized loading, e.g. positioned over the moving plate of the flexible element. Furthermore, the method of the invention is adapted to assembling parts of various shapes and functions. In this respect, FIG. 6 shows a mechanical part 1 forming a membrane constituted by a flexible element 4 that is attached to two anchor blocks 2, each provided with its own thickening 8.

Furthermore, the mechanical parts may be made of different given materials, e.g. silicon or copper, depending on the intended application. In addition, it should be assumed that the material constituting the support 18 is selected in such a manner that the coefficient of expansion of said material is substantially of the same order as that of the material constituting the mechanical part 1. Naturally, such a support-constituting material must also provide insulation between the zone 21 in which the anchor block is fixed and the stationary plate 19. The support 18 must also make it possible to deposit layers of material suitable for forming the fixing zone 21 and the stationary plate 19. A material that is particularly suitable for satisfying all of the functions required of the support 18 is alumina.

FIG. 4 shows, in simplified manner, an embodiment of a grasping tool 22 enabling the assembly method of the invention to be performed. The tool 22 comprises a grasping head 26 having an open recess 28 formed in a transvers face 26a, the recess being delimited by a peripheral edge 28a that is preferably tapering, and that performs a thrust and centering function on the thickening 3 of the sensor 1. For example, the recess 28 may have a right cross-section in the form of a polygon that serves to center the thickening 8 whose outline is, at least in part, complementary. The head 26 is also provided with at least one suction duct 31 opening out into the recess 28 to establish suction between the bottom of the recess 28 and the face 11 of the thickening so as to secure a sensor co-operating with the peripheral edge 28a of the recess.

The grasping head 28 is also provided with a presser member 32 projecting into the recess 28 so as to be able to exert localized force on the thickening 8. The presser member 32 is preferably provided with a pointed terminal portion 32a and is removably mounted inside the head 26 while enabling the extent to which the terminal portion 32a projects into the recess 28 to be adjustable.

The grasping head 26 is fitted to a conventional machine (not shown) suitable for displacing the sensor from a storage area to the support 18 on which it is to be assembled. The grasping head may also be driven with reciprocating linear and/or rotary motion so as to subject the sensor to mechanical stress while it is contact with the support. Similarly, the tool 22 may also be driven with linear and/or rotary reciprocating motion to subject the support to vibration. The mechanical stresses exerted on the support or the sensor to obtain appropriate diffusion of the components of the eutectic into each other are preferably generated by ultrasound from a source that is not shown.

Figure 7:
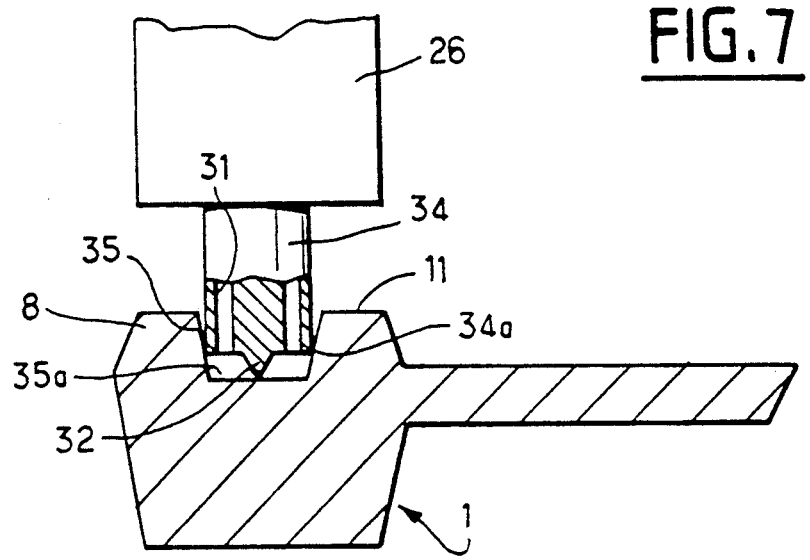
FIG. 7 is a section view showing another embodiment of a mechanical part enabling the assembly method of the invention to be performed.

FIG. 7 shows another embodiment of a grasping tool enabling the assembly method of the invention to be performed. In this example, the grasping head 26 is fitted with a tenon 34 provided with suction ducts 31 and with a presser member 32 such as a pointed tip. The tenon 34 is designed to co-operate with a mortise 35 formed in the thickening 8 of the sensor on an axis substantially perpendicular to the face 11. The tenon 34 has an outside thrust and centering edge 34a for co-operating with the peripheral edge 35a of the mortise. Advantageously, the mortise is made by a conventional photoetching method.

SUITABILITY FOR INDUSTRIAL APPLICATION

The invention is preferably applied to making capacitive type sensors of mechanical magnitudes.

The invention is not limited to the examples described and shown, since various modifications may be provided without going beyond the ambit of the invention.

What is claimed is:

1. A method of assembling on an insulating support a mechanical part such as a sensor or a membrane of the type constituted by a monolithic semiconductor substrate forming firstly an anchor block including a connection face extending in a reference plane and secondly at least one flexible element including first and second opposite faces and cantilevered out from the anchor block, with said first face situated in a plane that is offset relative to the reference plane, the first face defining a moving plate which is positioned in a distance relationship relative to a stationary plate carried by the support; thereby constituting an empty gap co-operating with the moving and stationary plates to define a variable capacitor;

said method comprising the following steps:

making a thickening that projects relative to said second face of the flexible element and that is situated substantially over the connection face of the anchor block;

depositing a layer of one of the components of a eutectic at least on a fixing zone of the support for receiving the connection face of the anchor block;

using a grasping tool suitable for holding the mechanical part by means of the thickening thereof to move the part so that the connection face co-operates with the fixing zone of the support;

causing a rise in temperature to the eutectic point of the eutectic whose second component is formed by the part;

exerting a localized force on the thickening to ensure plane contact between the connection face and the fixing zone; and simultaneously with the application of the localized force, subjecting at least one of the part or the support to mechanical stresses enabling the part to be anchored on the support by soldering.

2. A method according to claim 1, further comprising:

making a mortise in the thickening;

causing the grasping tool to co-operate with the mortise by means of a tenon; and displacing the tool thus supporting the part so as to cause the connection face of the part to co-operate with the fixing zone of the support.

3. A method according to claim 1, further comprising making the thickening by photoetching a sensitive layer prior to chemical etching.

4. A mechanical part adapted to carry out an assembly method, the part comprising a monolithic semiconductor substrate forming firstly an anchor block including a connection face extending in a reference plane and secondly at least one flexible element having first and second opposite faces and cantilevered out from the anchor block, with said first face being situated in a plane that is offset relative to the reference plane to leave an empty gap between said planes, the first face defining a moving plate, the mechanical part further comprising a thickening projecting relative to the second face of the flexible element and situated substantially over the connection face of the anchor block, the thickening enabling the part to be grasped for the purpose of being assembled on a support.

5. A part according to claim 4, wherein the thickening includes a mortise having an axis substantially perpendicular to the connection face.

6. A tool for grasping a mechanical part comprising a monolithic semiconductor substrate forming firstly an anchor block including a connection face extending in a reference plane and secondly at least one flexible element having first and second opposite faces and cantilevered out from the anchor block, with said first face being situated in a plane that is offset relative to the reference plane to leave an empty gap between said planes, the first face defining a moving plate, the mechanical part further comprising a thickening projecting relative to the second face of the flexible element and situated substantially over the connection face of the anchor block, the thickening enabling the part to be grasped for the purpose of being assembled on a support, wherein the tool comprises a grasping head including a recess or a tenon delimited by a peripheral thrust and centering edge for providing thrust and centering of the thickening of the mechanical part, the recess or the tenon being provided firstly with at least one suction duct opening for establishing suction between the head and the thickening to hold the part so that the part co-operates with the peripheral thrust edge, and secondly a presser member extending into the recess to apply a localized force on the thickening.

7. A tool according to claim 6, wherein the presser member is provided with a pointed terminal portion.

8. A tool according to claim 6, wherein the presser member is removably mounted in the grasping head.

9. A tool according to claim 6, wherein the thrust and centering edge delimits a recess formed in the grasping head.

10. A tool according to claim 6, wherein the thrust and centering edge is carried by a tenon for co-operating with a mortise formed in the thickening of the mechanical part.

* * * * *